May 29, 1934.  M. HAAS  1,960,536
APPARATUS FOR GENERATING ENDS OF GEAR TEETH
Filed Sept. 5, 1930
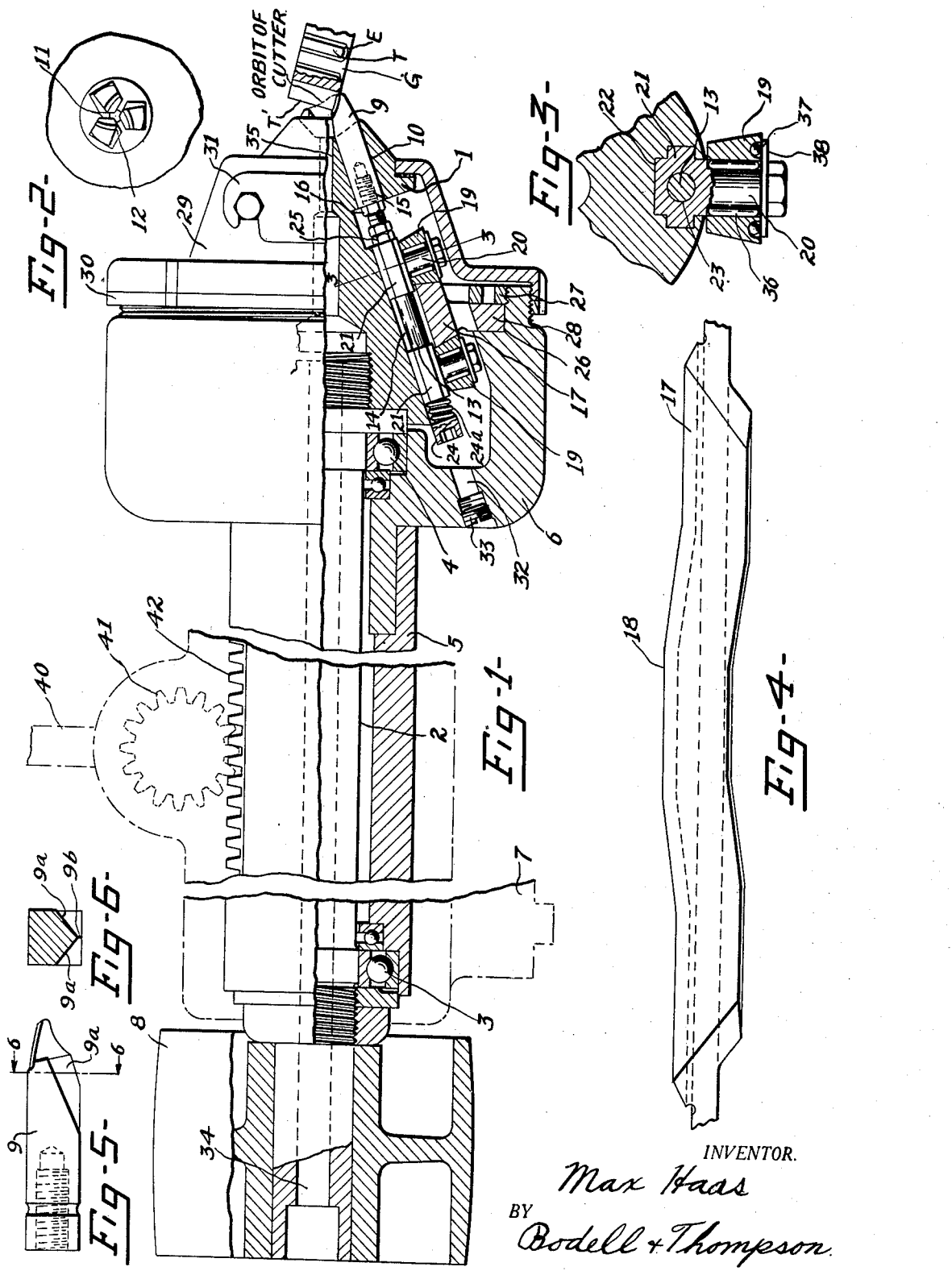
INVENTOR.
Max Haas
BY Bodell & Thompson
ATTORNEY.

Patented May 29, 1934

1,960,536

UNITED STATES PATENT OFFICE 1,960,536

APPARATUS FOR GENERATING ENDS OF GEAR TEETH

Max Haas, Syracuse, N. Y., assignor to W. C. Lipe Inc., Syracuse, N. Y., a corporation of New York Application September 5, 1930, Serial No. 479,955

7 Claims. (Cl. 90—15)

This invention relates to means for generating or cutting the ends of gear teeth to facilitate the meshing of the gears when one is shifted axially into mesh with the other, such as the gears of sliding gear transmissions of the type used in motor vehicles, which means is particularly simple in construction, and rapid in operation, and highly efficient and durable in use. Other objects appear throughout the specification.

The invention consists in the novel features and in the combinations and constructions hereinafter set forth and claimed.

In describing this invention, reference is had to the accompanying drawing in which like characters designate corresponding parts in all the views.

Figure 1 is an elevation, partly in section, of the cutter mechanism of this means.

Figure 2 is a fragmentary end elevation of parts seen in Figure 1, the gears being omitted.

Figure 3 is an enlarged, sectional view on line 3—3, Figure 1.

Figure 4 is a developed view, or layout of the cam.

Figure 5 is a detail view of the cutter.

Figure 6 is a section on line 6—6, Figure 5.

As is well known to those skilled in the art, the ends of the gears of sliding gear transmissions are formed to facilitate the intermeshing of the sliding gears without clashing, and various machines as different types of end cutters or facings are used. One form of machine is shown in the patent of George W. Sponable, No. 1,110,274, September 8, 1914. All of such machines have suitable mechanism for supporting the gear and indexing the same, and mechanism for actuating the cutter.

This machine differs from machines heretofore used in that the cutter revolves in an orbit, the axis of which is at an angle to the top face of the tooth being operated upon, or radial, or nearly radial to the axis of the gear and hence, the cutter while in one position in its orbit, passes across the end face of the tooth and cuts it and when passing to and from this position, moves in the spaces between the gear teeth and hurdles the gear tooth being operated upon when the cutter is in a position in its orbit diametrically opposite to its cutting position.

The subject matter of this invention is mechanism to alternately effect the projecting of the cutter into cutting position and the withdrawing of the same to hurdle the gear tooth when out of cutting position, and also a construction by which this rapid projection and withdrawing or reciprocation of the tool is accomplished without undue shock, and without the development of looseness in the mechanism.

This means for generating the ends of the gear teeth comprises a rotating head, a cutter eccentrically carried by the head and extending in a direction lengthwise thereof, and means for alternately withdrawing and projecting the cutter during each revolution of the head. There are a plurality of cutters, preferably three, spaced 120° apart about the axis of the head, and these cutters are arranged at an inclined angle to the axis of the head and converge toward their cutting ends with their cutting ends spaced apart from the axis of the head.

1 designates the head which is mounted upon a rotating shaft 2 mounted in journal and radial bearings 3, 4 located in a suitable tubular housing 5, and a stationary head 6, to be presently described, the tubular housing 5 being mounted in a bracket 7 forming part of the frame of the machine. The shaft 2 and hence, the head 1 are rotated in any suitable manner, the shaft 2 being here shown as formed with a pulley 8 through which power is applied from any suitable source. The rotating head 1 is mounted in the stationary head 6.

9 designates the cutters, these being mounted in suitable guides or passages 10 in the head 1, the guides and cutters being non-circular, they being here shown as square. The end portions of the cutters are tapered off at 11 toward the cutting edges 12 of the cutters, the tapering being provided to form a clearance for the cutters where they approach each other about the axis of the head 1. Each cutter is provided with a stem 13 extending through a passage 14 in the head 1. Each stem is adjustably connected to its cutter in order to adjust the cutter. As seen in Figure 1, each stem threads at 15 axially into its cutter and is held in its adjusted position by a lock nut 16.

The cutters project beyond the end of the head 1 and converge toward the axis of the head with the cutting ends located near said axis when in cutting position, that is, when projected to farthest extent beyond the end of the head 1, and each cutter is formed with surfaces $9^a$ on one side of the cutter, these surfaces meeting in an apex line $9^b$ extending in a direction lengthwise of the cutter. The surfaces on each cutter provide clearances for the other cutters when reciprocating into and out of their position occupied when extended into cutting position. As here shown, each cutter, or the body thereof, is square in cross section, and the surfaces $9^a$ extend in a plane nearly parallel to the axis of the head 1. Owing to the surfaces 9ª, the cutters can operate close to the axis of the head 1 without interferring with each other while the cutters are reciprocating into and out of cutting position.

The means for projecting and withdrawing the cutters during each rotation of the head comprises a stationary annular cam 17 carried by the stationary head 6 concentric with the head 1, follower means coacting with the cam, carriers for the follower means carried by the head 1, or guided in the head 1, and shiftable axially of the stem, and yielding buffer means acting on the carriers and the stem to yieldingly hold the followers against the cam and relieve them of shock during the reciprocation of the cutter, or to transmit the movement of the followers to the stem or cutter.

The cam 17 is here shown as an inwardly projecting rib or track having a single lift portion 18, and the followers or rollers 19 coacting with opposite faces of the cam 17, the followers or rollers 19 being mounted on studs 20 projecting from carriers 21 mounted in suitable guides 22 formed in the head 1, each carrier having a passage 23 through which the stem 13 extends. The stem and the carriers are capable of relative sliding movement which is resisted by the buffer spring means.

In the illustrated embodiment of my invention, a single spring is used for each stem. 24ª designates the spring which encircles the outer end of the stem 13 and is interposed between the outermost or left hand carrier 21 and the head 24 at the outer end of the stem, the spring being held from reacting or from displacing the stem 13 relatively to the carriers 21 by an adjustable shoulder or nut 25 threading on the stem against the end of the other, or right hand carrier 21. Thus, the spring thrusts in two directions. In one direction, it acts directly on the left hand carrier 21 to carry its roller to the right against the cam 17 and it acts indirectly on the other, or right hand carrier through the head 24 and the shoulder 25 to pull the right hand carrier 21, or its follower or roller 19 to the left against the cam.

Thus, the followers or rollers 19 are held against the cam so that there is no looseness between the cam and the follower, and the violent shocks that would otherwise occur, due to the rapid rotation of the head are taken and absorbed by the spring, and because of the spring, extreme accuracy or fit is not required.

The rollers 19 are preferably beveled or conical, but may be spherical, and coact with oppositely beveled faces of the cam so that the cam and the followers act beveled gear fashion, and there is no scouring of the rollers on the cam, as due to the beveling of the rollers and the cam, the rollers roll evenly on the cam and there is no steppage between the rollers and the cam. The annular cam is set in a suitable recess 26 in the stationary head 6 and is held therein by a ring 27 threading in the head against the base flange 28 and the cam. The outer end of the stationary head 6 is closed and hence, the head 1 is enclosed by a cover 29 having an opening through which the nose of the head 1 extends, this cover threading on the stationary head 6 and being held from shifting by a lock ring 30. The cover 29 is provided with a work hole normally closed by a removable plate 31 through which the adjusting nuts 16 and 25 are accessible. Also, the head 6 is formed with a work hole, as the hole 32 through which the stems 13 can be adjusted, this hole 32 being normally closed by a plug 33 so that the head is oil tight. It will be understood that the head 1 rotates in oil, that is, that the head 6 is filled with lubricating oil, and suitable provision is made for a breather opening.

As is understood by those skilled in the art, cutting operations of this sort are performed in oil, that is, the cutters are cooled by a stream of oil being played thereon. This oil may be projected onto the work through an axial passage 34 in the shaft 2, and 35 in the head 1, or if this oil is projected from outside the head onto the work, air may be blown through the passages 34, 35 to blow the oil and chips away from the cutters, particularly to prevent the cooling oil from working up along the cutters 9 into the stationary head 6.

The cutter is arranged to rotate on an axis perpendicular to the axis of the gear G or inclined slightly out of the perpendicular more or less, it being shown in Figure 1 as inclined slightly out of perpendicular relation to the angle of the gear G, or rather the gear G is shown as inclined relatively to the axis of the cutters of the head 1.

T designates teeth that have been provided with an end face E and T' designates the tooth being operated upon by the cutter. It will be noted that the axis of the rotating head 1, or the axis of revolution of the cutters 9 is at an angle to the top face of the tooth being operated upon so that the cutters 9 or their orbits pass lengthwise of the tooth being operated upon.

In Figure 1, one cutter is shown as in cutting position coacting with the end face of the tooth, and the other cutters as being withdrawn and hurdling the tooth being operated upon. The contour of the cut, and the amount of recedence of the end face of the tooth from the base toward the top, is determined by the shape of the cutter, and the amount of angularity of the gear G. The gear G is supported on a suitable arbor, as will be understood by those skilled in the art, and the indexing of the gear effected by any well known mechanism.

Antifriction bearings, as rollers 36, are interposed between the studs 20 and the rollers 19. Also, end thrust anti-friction or ball bearings 37 are interposed between the outer ends of the rollers 19 and bearing plates 38 at the ends of the studs.

The frame 5 is operated to feed the cutters to and from the work by a suitable handle 40 operating a pinion 41 meshing with a rack 42 on the housing 5.

After the gear G is mounted, the handle 40 is operated to feed the cutter head to carry the cutters in the working range. The cutting and indexing takes place automatically until the last tooth is finished, and then the handle 40 operated to withdraw the cutter head. The indexing mechanism and the support form no part of this invention.

Owing to the cutters and the means for reciprocating them, the ends of the gear teeth can be cut in a much shorter time, and further owing to the mounting of the cutters all shocks that would otherwise make the machine useless in a short time, are absorbed. Further owing to the means by which the cutters are caused to hurdle the gear tooth, the shaping of the ends of the gear teeth can be effected accurately and rapidly.

What I claim is:

1. Means for generating the ends of gear teeth comprising a rotating head, a cutter eccentrically carried by the head and shiftable lengthwise thereof, the outer end of the cutter projecting beyond the face of the head, and the head having means for guiding the cutter, a stem for each cutter, the head being formed with a passage through which the stem extends, the stem being slidably mounted in the passage whereby the stem and cutter are reciprocated during the rotation of the head, an annular, stationary cam arranged concentric with the axis of the head, followers coacting with the cam, carriers having the followers mounted on the stem, and yielding means between the stem and the carriers for holding the followers against the cam.

2. Means for generating the ends of gear teeth comprising a rotating head, a cutter carried by the head and shiftable into a direction lengthwise thereof, the outer end of the cutter projecting beyond the face of the head, and the head having a guide for the cutter, a stem for the cutter, and means for reciprocating the cutter during each revolution of the head, said means coacting with the stem, the stem threading into the cutter and operable to adjust the same, and means for holding the stem and cutter in their adjusted positions.

3. Means for generating the ends of gear teeth comprising a rotating head, a cutter carried by the head and shiftable into a direction lengthwise thereof, the outer end of the cutter projecting beyond the face of the head, and the head having a guide for the cutter, a stem for the cutter, and means for reciprocating the cutter during each revolution of the head, said means comprising an annular cam stationary concentric with the head, a pair of followers coacting with the cam, carriers for the followers spaced apart along the stem and guided in the head, and spring means for holding the followers against the cam.

4. Means for generating the ends of gear teeth comprising a rotating head, a cutter carried by the head and shiftable into a direction lengthwise thereof, the outer end of the cutter projecting beyond the face of the head, and the head having a guide for the cutter, a stem for the cutter, and means for reciprocating the cutter during each revolution of the head, said means comprising an annular cam stationary concentric with the head, a pair of followers coacting with the cam, carriers for the followers spaced apart along the stem and guided in the head, the carriers being movable along the stem, an adjustable thrust shoulder on the stem coacting with one carrier to hold the companion follower against the cam, a spring acting in the opposite direction on the other carrier, the spring thrusting axially against the stem, whereby the spring acts indirectly in one direction on one carrier, and directly in the opposite direction on the other carrier.

5. Means for generating the ends of gear teeth comprising a rotating head, a cutter carried by the head and shiftable into a direction lengthwise thereof, the outer end of the cutter projecting beyond the face of the head, and the head having a guide for the cutter, a stem for the cutter, and means for reciprocating the cutter during each revolution of the head, said means comprising a projecting annular cam having oppositely beveled faces, beveled rollers coacting with said faces, carriers for the rollers spaced apart along the stem and slidable relatively thereto, the carriers being guided in the head, and buffer spring means acting on the carriers to hold the rollers against the cams.

6. Means for generating the ends of gear teeth comprising a rotating head, a cutter carried by the head and shiftable into a direction lengthwise thereof, the outer end of the cutter projecting beyond the face of the head, and the head having a guide for the cutter, a stem for the cutter, and means for reciprocating the cutter during each revolution of the head, said means comprising a projecting annular cam having oppositely beveled faces, beveled rollers coacting with said faces, carriers for the rollers spaced apart along the stem and slidable relatively thereto, the carriers being guided in the head, and buffer spring means acting on the carriers to hold the rollers against the cams, and means for adjusting the tension of said spring means.

7. Means for generating the ends of gear teeth comprising a rotating head arranged with its axis at an angle to the axis of the gear and to the top face of the tooth being operated on, a cutter mounted in the head eccentric thereto and projecting beyond the face thereof, the cutter extending at an inclined angle to the axis of the head and having its cutting edge located near and at one side of said axis, the cutter being movable by the head in an orbit extending lengthwise of and between the teeth of the gear and of less diameter than the length of a tooth of the gear, and means for alternately withdrawing and projecting the cutter once during each rotation of the head to project the cutter to engage the end face of the gear tooth and to hurdle the intermediate part of the tooth during the withdrawing action.

MAX HAAS.